Feb. 24, 1953  G. D. FITCH  2,629,792
MOTOR STARTING SWITCH
Filed Feb. 23, 1950  2 SHEETS—SHEET 1
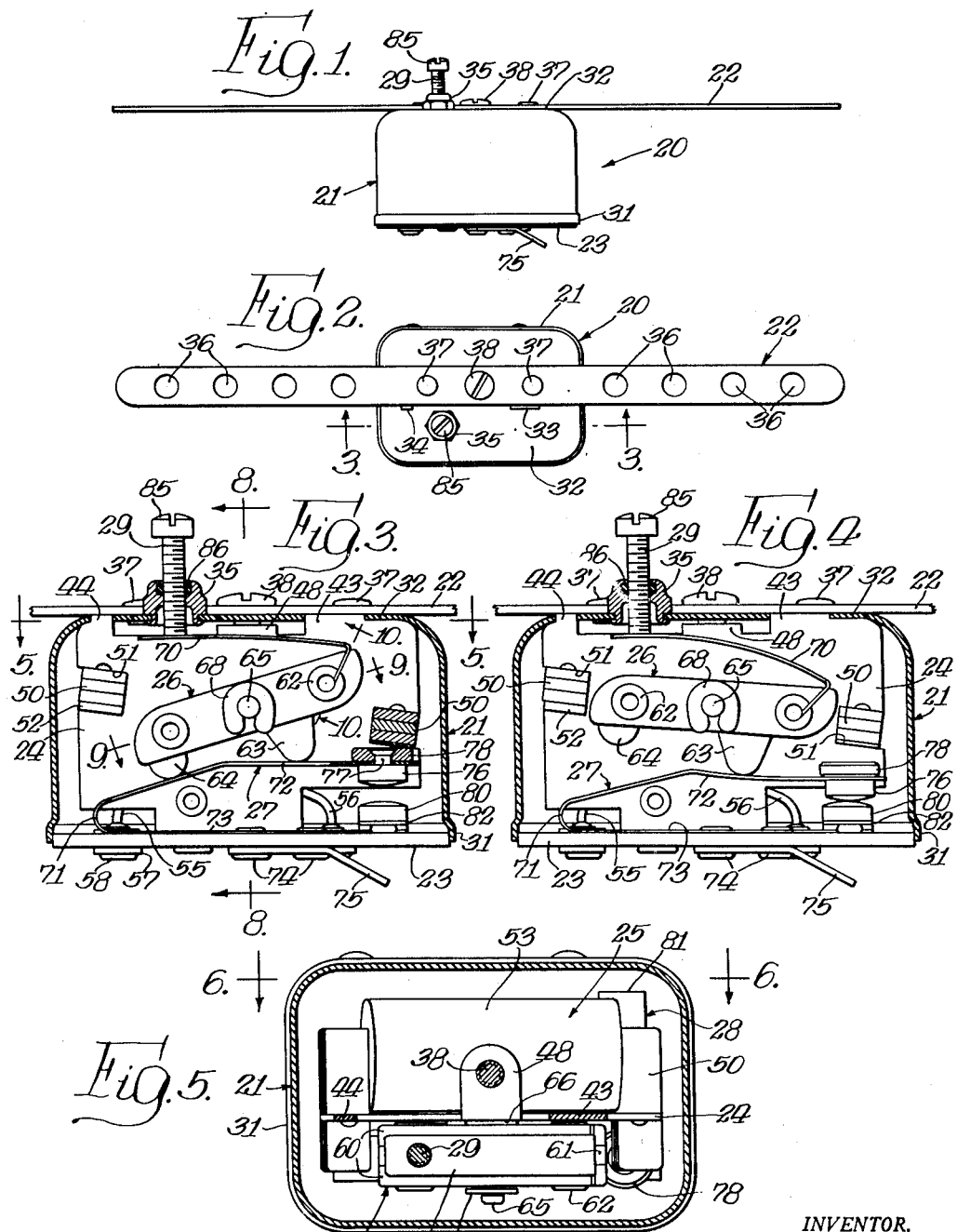
INVENTOR.
Grant D. Fitch,
BY Brown, Jackson,
Boettcher & Dienner
Att'ys

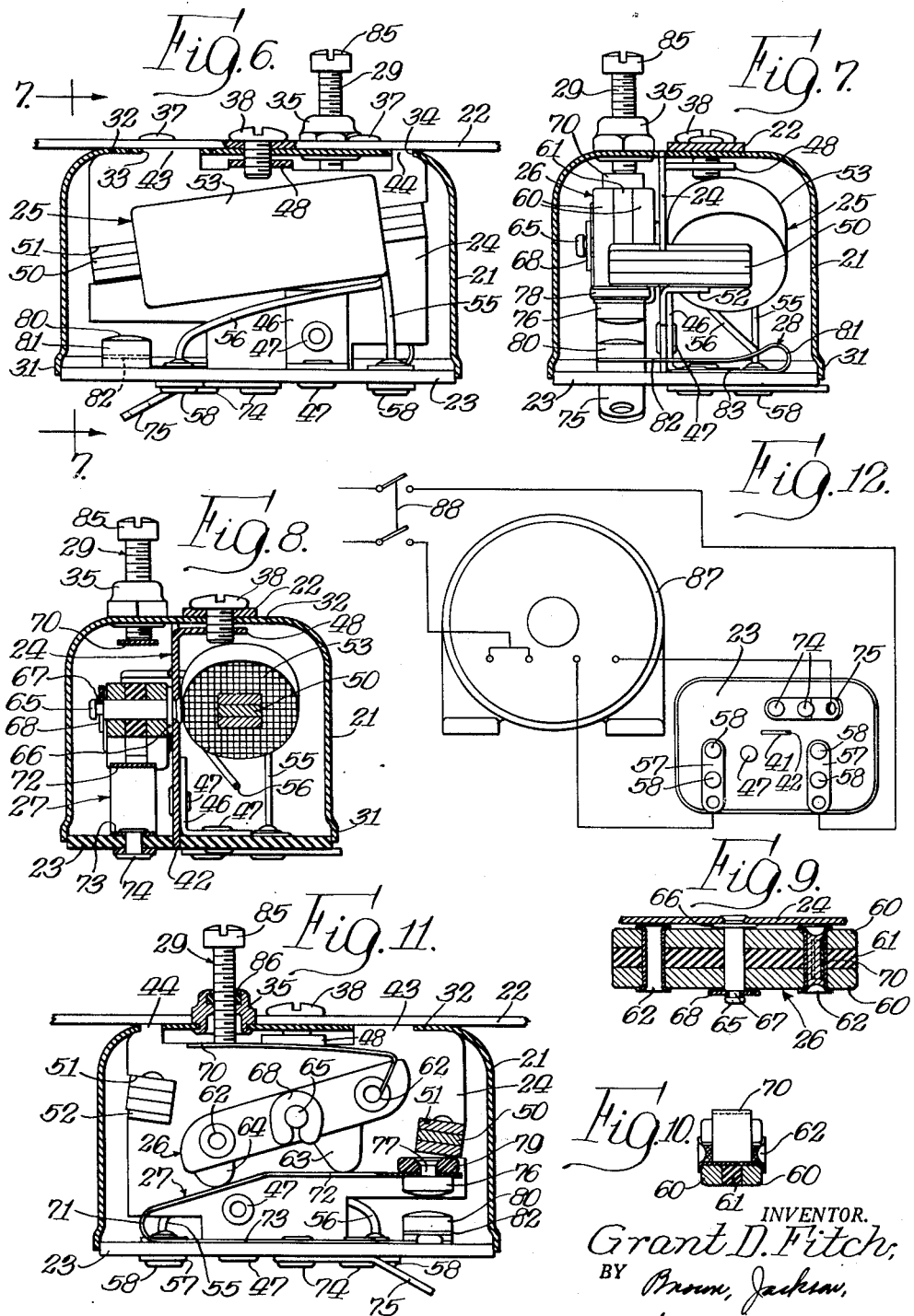

Patented Feb. 24, 1953

2,629,792

UNITED STATES PATENT OFFICE 2,629,792

MOTOR STARTING SWITCH

Grant D. Fitch, Chicago, Ill., assignor to Fitch, Allen & Company, Chicago, Ill., a copartnership Application February 23, 1950, Serial No. 145,734

7 Claims. (Cl. 200—87)

My invention is concerned with an improved motor starting switch of the magnetic type.

More particularly, my invention is directed to a new and improved detachable motor starting switch unit adapted for universal installation with single phase, split phase, or capacitor single and dual voltage electric motors.

The need for a universal type of starting control switching unit, capable of easy and ready installation with various sizes and types of electric motors, operating under a variety of conditions, has long been desired. In the past, starting control switches have been presented to the public, but the inability to adapt those switches for ready installation with motors of various sizes and capacities has resulted in the provision of each class and size of motor with special tailormade control switches. The obvious expense and inconveniences resulting from this manufacturing and design approach is readily apparent.

I have invented a starting control switch capable of refined adjustment and ready installation as a single unit and adapted for use with motors of various types and sizes, thereby consolidating the features of several starting control switches in a single unit.

The main object of my invention is to provide an electric motor starting control switch capable of refined adjustment to meet the starting demands and characteristics of motors of various sizes and types.

An important object of my invention is to provide a motor starting control switch capable of automatically exciting the starting circuit of an electric motor in response to current flow in the working windings of that motor.

Another object of my invention is to provide a motor starting control switch capable of opening the starter winding circuit of a motor in response to normal current flow in the working windings of the motor, after the motor has come up to a predetermined operating speed.

Still another object of my invention is to provide a unitary motor starting circuit control switch, magnetically actuated and contained in a compact, dust, rust, water and gas proof case capable of adapting this switch for use under a variety of operating conditions.

Briefly, my switch contemplates a circuit closing device actuated by an electromagnet comprising a metal core surrounded by an energizing coil connected in series with the working windings of an electric motor. The electromagnet is associated with a single armature arranged to close a pair of resiliently mounted contact points which, in turn, control the starting winding circuit of the motor. The armature is also magnetically actuated in opposition to a resilient spring member capable of exerting adjustable spring pressure against the closing rotational movement of the armature, whereby the switch may be adapted to operate at various starting currents and voltages as desired. The installation of the switch with the motor is such that upon the initial starting current surge in the operating windings of the motor, the switch's electromagnet will responsively attract the switch armature to cause the starting circuit of the motor to become energized. Upon reaching of a predetermined R. P. M., where the initial surge of the starting current in the operating windings has leveled off to a substantially lower value, the armature of the switch will be resiliently returned to its initial position, opening the starting circuit due to a lessening of the magnetic force created by the electromagnet; this magnetic force having acted to bias a return spring associated with the switch armature. Upon a lessening of the electromagnetic force, the biased returned spring will resiliently return the armature to an opening position, whereby the starting circuit associated with the motor will be opened.

The several novel features and objects of my invention will become more clear from time to time as the following detailed description proceeds. In order to acquaint those familiar with this art as to the mode of constructing and utilizing my invention, reference is herein made to the accompanying drawings, in which:

Figure 1 is a side elevational view of a switch made in accordance with my invention, showing the outer housing and mounting means;

Figure 2 is a top plan view of the switch shown in Figure 1;

Figure 3 is an enlarged detailed cross-sectional side elevation taken substantially along line 3—3 of Figure 2, showing the switch armature in its open starting circuit position;

Figure 4 is a cross-sectional view similar to Figure 3, showing the switch armature in its closed starting circuit position;

Figure 5 is a top plan view of the switch shown in Figures 3 and 4, at the same scale therewith;

Figure 6 is a side elevational cross-sectional view taken along line 6—6 of Figure 5, looking in the direction of the arrows;

Figure 7 is a cross-sectional end view taken along line 7—7 of Figure 6;

Figure 8 is a cross-sectional end view taken along line 8—8 of Figure 3 looking in the direction indicated by the arrows;

Figure 9 is an enlarged detailed sectional view of the switch armature taken along line 9—9 of Figure 3, looking in the direction indicated by the arrows;

Figure 10 is an enlarged detailed cross-sectional end view of the switch armature shown in Figure 9, taken substantially along line 10—10 of Figure 3;

Figure 11 is an enlarged detailed cross-sectional side elevational view similar to Figure 3, showing an alternate switch construction; and Figure 12 is a schematic wiring diagram showing my switch in a typical operating connection with an electric motor.

Referring now to the drawings, particularly Figures 1, 2, 3 and 6, it will be seen that my switch, indicated generally at 20 in Figures 1 and 2, comprises briefly an open bottom outer housing 21, a mounting strap 22 secured to the upper side of the housing 21, a base plate 23 mounted in the bottom of the housing, a vertical inner wall 24 extending vertically from the base plate to the upper interior wall of the housing, an electromagnet 25 mounted on one side of the vertical inner wall, a rotatable armature 26 mounted opposite the electromagnet on the opposite side of the inner wall therefrom, a resiliently movable upper contact spring 27, a resiliently movable lower contact spring 28 mounted below the upper contact spring, and an adjusting screw 29 threaded vertically through the top of the outer housing for adjusting the rotatable resistance of the armature.

For clarity of understanding, each of the above named elements shall be described in the order in which they appear above, along with their associated appurtenances and functions.

The housing 21, as seen in Figures 1 and 2, comprises generally a rectangularly shaped hollow metal shell having an open bottom therein adapted to receive the base plate 23. For this purpose, an enlarged outwardly flared lower skirt 31 is provided extending around the lower periphery of the shell to form an internal shoulder for the reception of the base plate 23. A top wall 32 of the housing as seen clearly in Figure 2, is provided with a pair of slotted apertures, 33 and 34, aperture 33 being substantially longer than aperture 34; both apertures being disposed along a common line disposed about midway of the width of the top wall 32 for receiving location nibs integrally associated with the vertical inner wall 24, as will appear presently. Provision is also made for mounting the adjusting screw 29 through the top 32 of the housing shell 21 by means of a hexagonal internally threaded collar 35, as will be described more fully in connection with the adjusting screw hereinafter.

The mounting band 22, as shown in Figures 1 and 2, comprises a rectangularly shaped metal strap having a plurality of mounting holes 36 formed at periodic intervals along its length and securely fastened to the top wall 32 of the housing shell 21 by means of a pair of suitable rivets 37 in a conventional manner. A central screw receiving aperture is formed through the mounting strap and the top wall 32 of the housing for the reception of a mounting screw 38, whereby the inner wall and base plate 23 may be securely fastened to the shell. In use, the mounting strap is adapted to be stretched across a suitable mounting opening in a motor shell or bent at right angles around the ends of the housing in a suitable manner, whereby the switch may be adjustably mounted in a variety of positions in a conventional manner.

The base plate 23, as previously noted, is adapted for reception in a skirted channel 31 formed by the enlarged lower periphery of the housing shell. The base plate, as shown herein and in its preferred form, is composed of a substantially rectangular plate of insulating material suitably cut to conform to the skirted contour of the housing to thereby form a tight fit between the base plate and the housing shell. The base plate acts as the retaining member for suitable connecting terminals, whereby the switch may be operatively interposed in the suitable control circuit, as will presently appear hereinafter. A centrally disposed longitudinal rectangular aperture 41 is formed in the base plate, as seen clearly in Figure 12, for the reception therein of a locating nib 42 associated with the vertical inner wall 24; this aperture being in registering alignment with the two previously described slotted apertures 33 and 34 formed in the top wall 32 of the housing shell 21.

The vertical inner wall 24, as seen in Figures 3, 5, 7 and 8, is shown in its preferred form as a rectangular metal plate disposed about midway between the side walls of the housing shell and reaching vertically upward in the interior of the housing to extend between the upper wall 32 of the housing shell and the base plate 23. A rectangular long locating nib 43 and a shorter rectangular locating nib 44 are formed along the upper limits of the vertical inner wall in a manner and of a size suitable for reception by the locating slotted apertures 33 and 34 respectively formed in the upper wall of the housing shell 21, whereby the vertical inner wall is positively located and held in its vertical upright position, with respect to the top wall 32 and the base plate 23. The similar locating depending nib 42 is formed along the bottom edge of the vertical inner wall for reception by the single locating slotted aperture 41 formed in the base plate 23, as previously mentioned. Positive connection with the base plate is provided by means of a mounting angle 46 securely riveted to and extending between the base plate 23 and the vertical inner wall 24 by rivet members 47, whereby the vertical inner wall is assured of a right angular projecting position with respect to the base plate 23. An integrally formed mounting ear member 48 is disposed at right angles to the vertical inner wall along its upper edge adapted for the reception of the mounting screw 38 extending through the mounting band and the upper top wall of the housing shell, as previously mentioned and as it is clearly shown in Figure 8 of the drawings. The main function of the vertical inner wall is to act as a structural support for the electromagnet 25 and as a separator between the electromagnet and the armature 26, as shall presently appear.

The electromagnet 25 is herein shown as comprising a laminated core member 50, comprising three metal plates formed in the shape of a C; the right angularly extending ends adapted to be received in suitable apertures 51 formed in the vertical inner wall 24; the metal removed from such apertures being bent at right angles to the vertical inner wall to form guide and supporting platforms 52, as shown in Figures 7 and 8. The laminated core member 50 is surrounded in a conventional manner by a suitable number of turns of copper wire to form a coil 53 thereabout.

Insulating material may surround the coil 53, to thereby form a protective insulation between the electromagnet 25 and the vertical inner wall.

It will be seen, from Figures 5 and 7, that the right angular extensions of the core are adapted to project through the inner wall to lie in an overhanging position at right angles therewith, thereby providing means for subjecting the rotatable armature 26 to the electromagnetic field set up by the electromagnet upon the introduction of suitable electric current thereto. Connective leads 55 and 56 comprise the ends of the coil winding 53 and are adapted to be connected in circuit with the working windings of the motor, by means of terminal connectors 57 mounted on the bottom of the base plate 23. Connection between the terminals 57 and the leads 55 and 56 of the coil is made by means of suitable rivet members 58, to which the terminal leads are suitably soldered in a conventional manner. The rivets 58 are also disposed between the terminal connectors 57 and the base plate to aid in fastening these connectors to that plate. Positive connection of the projecting ends of the core 50 and the vertical inner wall may be accomplished by means of soldering the right angularly projecting ends of the core to the support platforms 52 of the vertical inner wall. It should be noted that the core and electromagnet are not disposed in a horizontal position, but lie at an incline along the right hand side of the inner wall, as viewed in Figures 6 and 7.

The armature 26 may be disposed for rotational movement between the right angularly projecting ends of the electromagnetic core which protrude outwardly from the vertical inner wall, as seen in Figures 3, 4 and 11. The armature, as herein disclosed in Figures 9 and 10, comprises a pair of substantially rectangular metal plates 60 separated by an insulating plate 61, the three plates being arranged in rigid construction. Connection between the armature's plates is made by hollow rivet members 62, adapted to be received in suitable openings formed in the three plates and upset in a conventional manner exteriorly of the two metal plates 60 as is seen clearly in Figure 9 of the drawings. The insulating plate 61 is provided with a pair of depending ear members 63 and 64; the longer of the two ears 63 being for purposes of initiating contact between the contact springs 27 and 28 for operatively closing the switch and the shorter of the two ear members 64 being provided for insulating purposes between the armature and the upper contact spring 27, as will presently appear. As shown in Figures 3, 4 and 11, the upper left hand and the lower right hand corners of the armature are provided with a curvilinear profile for allowing the armature to clear the projecting ends of the electromagnetic core in its rotational movement therebetween. Pivotal mounting of the armature with the vertical inner wall is provided by means of an armature stem 65 having an inner flange member 66 adjacent the inner wall 24; rigid connection between the armature stem and the inner wall being made by upsetting the protruding inner end of the armature stem, after it has passed through the inner wall, in a suitable riveting manner.

The outer end of the armature stem is provided with a recessed annular groove 67 adapted to receive a horse shoe retainer 68 having a pair of bifurcated arms separated a sufficient amount whereby they will resiliently grip the armature stem in their mounted position in the retaining groove; the armature first being mounted on the stem by means of a suitable cylindrical opening adapted to receive the stem therein, as is seen clearly in Figures 3 and 4.

An upper leaf spring 70 is mounted to the armature at the right end thereof as seen in Figures 3 and 4 and extends backwardly along the length of the armature for resilient contact with the lower depending end of the adjusting screw 29. Positive connection between the spring and the armature may be conveniently made by a bead of solder disposed along one of the armature's metal plate members 60 to securely hold the right hand end of the spring in a suitable receiving slot formed for that purpose in the right hand upper corner of the armature. As will become obvious from the drawings and the features of this construction, the upper leaf spring acts as a deterrent to the clockwise rotational movement of the armature as viewed in Figures 3, 4, and 11, thereby providing a resilient returning pressure to cause counterclockwise rotation of the armature upon a decrease in the intensity of the magnetic attraction of the electromagnetic core.

The upper contact spring 27 is herein shown as a rectangular metal leaf spring preferably made of beryllium copper, having a semi-circular bend 71 formed along its length whereby upper and lower arms 72 and 73 are formed thereof. The upper arm as is seen in Figure 3, is adapted to extend angularly upward from the bend 71 and is then again turned downwardly to lie in substantially parallel registering relation above the lower arm disposed in a horizontal disposition on the base plate 23. Connection of the lower arm of the upper contact spring and the base plate 23 is made by a pair of rivets 74 extending through a suitable terminal connector 75 for connecting the switch with the starting circuit of the motor; the rivets extending upwardly through the terminal connector, base plate and lower arm 73 with the upper projecting ends being upset in a conventional manner. The right hand end of the upper contact spring is provided with a downwardly projecting cylindrical contact button 76 herein shown as preferably made of coin silver metal or the like. Connection between the silver contact button 76 and the right hand end of the upper contact spring is made by a rivet stem 77 formed as a contiguous part of the contact button and adapted to receive a larger metal annular armature button 78 as is shown in Figures 3 and 4. Viewing the form of switch displayed in Figures 3 and 4, the metal armature button is attracted to the core 50 of the electromagnet 25 to cause the upper contact spring to act as a second armature in the switch, whereby upon energization of the electromagnet the upper contact spring is attracted to the overhanging protruding end of the core at the right hand end of the switch. This magnetic attraction creates a resistance to the downward movement of the upper leaf spring normally induced by the rotational movement of the armature 26. With this arrangement, the switch is assured of a snap closing action very similar to the features of the switch disclosed in patent to James G. Juhasz, No. 2,438,609, issued on March 30, 1948, entitled "Circuit Control Device."

In the form of switch shown in Figure 11 however, which is herein a preferred embodiment of the upper contact spring actuation, a plastic insulating button 79 replaces the metal armature button 78 to eliminate the snap closing actuation of the upper contact button 76 with a lower contact button 80. This arrangement has been found to be a more desirable style of switching action, in that the bouncing of the upper contact buttons against the lower contact button 80 is thereby prevented.

The lower contact button 80 is mounted on the resilient lower contact spring 28 whereby the two contact buttons are in registering relation above and below one another to form suitable circuit closing contact points. The lower contact spring is disposed transversely of the base plate 23 at right angles to the disposition of the upper contact spring as displayed clearly in Figure 7. This spring is provided with a returning bend 81 similar to bend 71 of the upper contact spring to thereby provide upper and lower arms 82 and 83 respectively of the lower contact spring. The lower arm of the lower contact spring has common circuit connection with the terminal lead 56 of the electromagnet and is secured to the lower base 23 by the rivets 58 which extend through the terminal connector 57 associated with the electromagnet and adapted to connect the incoming side of the switch in series with the working windings of the motor therein. The lower contact button is similar in all respects to the upper contact button, with the exception that no upper insulating button is provided on the opposite side of the lower contact spring therefrom as was described in connection with the upper contact spring.

The adjusting screw as previously mentioned is adapted to extend vertically through the upper top wall 32 of the housing shell 21 and is herein shown as a conventional cylindrical screw having a slotted head 85 thereon at its upper end for threading the screw in the collar 35 by means of a screw driver or the like. The mounting collar 35 is provided for connection of the adjusting screw with the upper top wall of the housing; the collar being turned over at its lower end to firmly grip the upper top wall in a manner similar to a rivet. A sealing gasket member 86 is inserted in surrounding relation to the adjusting screw inside of the mounting collar for providing a dust and airtight seal around the threaded stem of the adjusting screw. As previously noted, the lower depending end of the threaded stem of the adjusting screws contacts the upper surface of the upper leaf spring 70 associated with the armature, whereby the resilient returning pressure exerted by that spring on the clockwise rotational movement of the armature as induced by the excitation of the electromagnet may be adjusted. This resilient adjustment of course, regulates the closing magnetic field necessary for rotating the armature 26 clockwise to depress the upper contact spring whereby the two contact buttons 76 and 80 will come into circuit closing contact relation with one another. Conversely, the amount of resilient pressure exerted by the upper leaf spring, as adjusted by the adjusting screw, regulates the opening of the switch, determining, in a sense, the amount of magnetic field necessary to maintain the armature in its closed position; the magnetic force exerted by the electromagnet being necessarily greater than the unbiasing force exerted by the upper leaf spring in order that the contact buttons remain closed. This adjustable feature adapts my switch to a variety of operating conditions; the vertical positioning of the adjusting screw determining the opening and closing of the switch in response to the current flow in the working winding of the motor which is sought to be regulated.

*Use and operation*

As previously noted, the switch 20 operates on a magnetic principle and is connected in series with the working windings of an electric motor 87, as is shown schematically in Figure 12. The two terminals 57 serve to connect the switch in series with the motor's working windings. Upon energization of the incoming lead 56 the electromagnet 25 will be energized in response to the surge of current flowing to the working windings of the motor. Characteristically, upon starting of an electric motor, the initial surge of current to the working windings is substantially greater than the normal working load; this surge serving to excite the electromagnet of my switch almost immediately upon closing of a line switch 88 as shown in Figure 12. Upon presentation of sufficient magnetic flux, as produced by the electromagnet, the armature 26 will be attracted from its Figure 3 position to the inclined position between the projecting ends of the electromagnetic core 50, as shown in Figure 4. Such a depression or clockwise rotation of the armature causes a resilient lowering of the upper contact spring to bring the upper contact button in circuit closing relation with the lower contact button. Upon the contacting of the two buttons, the circuit to the starting windings of the motor is closed; connection of the switch to the starting windings of the motor being made by terminal 75 associated with the upper contact spring. The incoming electrical current then is channelled to the electromagnet through the incoming terminal 57 and lead 56 and flows through the lower contact button to the upper contact button, the upper contact spring and down into the starting circuit terminal 75 to excite the starting winding circuit of the motor. When the motor 87 has been brought up to a designated and predetermined rotational speed, there is a gradual leveling off of the current flow in the working windings of the motor. This phenomenon results in a lessening of the force of the magnetic field created by the electromagnet of the switch thereby allowing the armature 26 to return to its Figure 3 position under the influence of the resilient returning action of the upper leaf spring 70. With a return of the switch armature to its Figure 3 or open circuit position, of course, the contact points are separated opening the starting circuit to the motor as is desired.

In the particular preferred embodiment of my starting control switch as shown herein in Figure 11, motors from ⅙ to ⅓ horsepower inclusive, operating at 110 to 220 volts at 50 to 60 cycles alternating current, can be adequately controlled in their starting cycle. This switch will start motors in the above designated ranges within any standard rotational speed rating, and even under the heavier starting loads having a voltage variation of 15 to 30% either plus or minus from their normal, according to the design of the particular motor being controlled. It should further be noted that no internal adjustment is necessary in regulating the opening and closing periods of my switch; whatever adjustment is necessary for proper operation of the motor starting circuit being made by threading the adjusting screw in or out to vary the tension of the upper leaf spring 70. The adjustment possible by this method allows the switch to meet the operational characteristics of varying horsepower or varying voltages and adapts the switch for universal application to all types and makes of motors within the above horsepower designations for the particular design illustrated herein. Of course, it should be understood that a similar design of a larger capacity can be made according to the principles of my invention for horsepower motors beyond the range cited above.

To adjust the switch for the operating condition present, the adjusting screw is turned in extreme counterclockwise position, looking at the top of the switch. With the adjustment screw in this position, and the current turned on, the electric motor will normally start and remain on the starting winding until proper adjustment of the adjusting screw is made. To avoid damage of the starting winding, immediate adjustment should be made by turning the adjusting screw clockwise until the starting winding circuit associated with the motor cuts out. With the motor in its then normal operating condition, completion of the proper adjustment of the adjusting screw is made by adding one additional full clockwise turn thereof to arrive at the normal adjustment position. This additional turn of the adjusting screw assures satisfactory operation of the switch at rated motor voltage and allows for fluctuation of the motor voltage of from 15 to 30%. If there is an extreme fluctuating condition of the local power supply, additional adjustment may be necessary; also additional adjustment may be required if extreme overloading of the motor occurs on certain applications. The above described adjustment is the normal adjustment for my switch, but if extremely low voltages are present, additional adjustment of the adjustment screw of one full counterclockwise turn from its normal adjustment position should be adequate to adapt its operation to the conditions met under extremely low voltages. If the condition is encountered where there is abnormally high line voltage, an adjustment of the adjustment screw from its normal adjusted position of one full clockwise turn should meet typical high voltage conditions. It further should be noted that my switch is adapted for installation with split phase or capacitor motors as well as single phase motors such as is illustrated in Figure 12 of the drawings.

Thus it may be seen that I have provided and described an extremely simple and compact type of motor starting control switch adapted for installation in the motor starting control circuit of an electric motor or the like, capable of energizing and disconnecting the motor starting control circuit in accordance with the rotational speed of the motor and in response to the current flow present in the working windings of that motor.

While I have herein shown a preferred form in which my invention may be embodied, it will be readily understood that numerous changes and alterations, substitutions of equivalents, and modifications may be made therein without departing from its spirit and scope and therefore I do not wish to be limited to the specific embodiment illustrated except as may appear in the following appended claims.

I claim:

1. A motor starting control switch for successively energizing and deenergizing the starting windings of an electric motor, or the like, in response to the flow of electrical energy in the working windings of said motor, comprising, a housing, an electromagnet having separated, transversely extending poles mounted within said housing, a rotatable armature mounted alongside said electromagnet and between said poles thereof, said armature being rotatably movable in response to electrical energization of said electromagnet, a resilient leaf spring member connected in cantilever fashion to one end of said armature so as to extend over the same for normally biasing said armature transversely of the magnetic field between said poles, and adjustable screw means capable of being adjustably operated from outside said housing and engageable with said leaf spring member, internally of said housing, for adjusting the resilient biasing force exerted on said armature by said leaf spring member whereby the magnetic field necessary to attract said armature from its normally biased position to a position lying wholly within said magnetic field is varied with adjusted changes of said spring's biasing force.

2. A control switch adapted to control a starting winding circuit or the like of an electric motor, comprising in combination an insulating base plate, a vertical inner wall extending upwardly from said base plate, a laminated electromagnet core comprising a plurality of C-shaped metal plates rigidly joined together, said core being disposed in an inclined position along one side of said inner wall with right angularly extending ends thereof protruding through the opposite side of said inner wall; a coil of wire surrounding said core having suitable terminal leads therefrom for connection of said switch in electrical circuit, a rotatable laminated armature pivotally mounted to said inner wall, on the opposite side thereof from said core and surrounding coil, adapted to rotate along a vertical plane between said two extending ends of said core; an upper leaf spring inserted in one end of said armature and extending backwardly from said point of insertion along the length of said armature for resiliently opposing downward rotational movement of said armature, an upper contact spring lying in registering relation below said armature parallel to said inner wall, said contact spring being characterized by an upper arm having a freely depressible end thereof suspended parallel to said base plate and a lower arm rigidly fastened to said base plate and having current carrying connection with a terminal disposed on the underside of said base plate for connecting said switch in electrical circuit; an upper contact point depending from the depressible end of said upper contact spring, a lower contact spring rigidly connected to said base plate and to one of said coil's terminal leads, being transversely disposed across one end of said inner wall so as to extend on either side of said wall but having no contact or connection therewith, said lower contact spring being characterized by an upper and lower arm lying in spaced parallel relation with one another; and a lower contact button extending upwardly from said upper arm of said lower contact spring and adapted to be contacted by said depending upper contact button upon resilient depression of said upper arm of said upper contact spring during the downward rotational movement of said armature.

3. A switch as set forth in claim 2 in which the elements described therein are enclosed in a unitary outer housing in which said base plate serves as the bottom thereof, and an externally engageable adjusting screw threaded through the upper wall of said housing for adjustably contacting said upper leaf spring for regulating the resistance to rotative depression of said armature exerted thereon by said upper leaf spring whereby the magnetic force exerted by said electromagnet in response to the current flow in said coil, by which force said armature is depressed to bring said contact buttons into close circuit relation, may be varied.

4. In a motor control switch of the type described, a magnetically responsive rotatable armature, having a laminated construction comprising a pair of metal plates separated by an insulating plate all rigidly secured together as a unit, a pair of depending ears formed as a contiguous part of said insulating plate, one ear being longer than the other, the longer of said ears serving to depress an upper contact spring carrying an upper contact button to cause said button to contact a second below positioned resiliently depressible contact button during magnetic depression of one end of said armature; and the shorter of said ears acting as an insulating member and stop between said armature and said upper contact spring when the opposite end of said armature is depressed.

5. In a circuit control device adapted to energize and de-energize the starting windings of an electric motor in response to the current flow in the working windings of said motor, a rectangular base plate made of insulating material, a vertically disposed inner wall projecting upwardly from said base plate and rigidly mounted thereto, a rotatable armature pivotally mounted on one side of said inner wall, an electromagnet core, disposed on the opposite side of said inner wall from said armature, being characterized by a pair of right angularly disposed core ends adapted to be received in suitable openings in said wall whereby said ends may project through said wall to lie adjacent opposite ends of said armature; a wire coil surrounding that portion of said core interconnecting said right angularly projecting ends, said coil having a pair of terminal leads for connection with a pair of terminal connectors mounted on the underside of said base plate whereby said coil may be connected in an electrical circuit to be controlled; a lower contact spring disposed below one of said core ends, extending transversely through said inner wall, but not touching any part thereof; said lower contact spring being characterized by upper and lower arms lying in spaced parallel relation one above the other and interconnected by a contiguous and common re-entrant bend formed in said lower spring; the lower arm of said lower contact spring having common connection with one of said leads and terminal connectors associated with said coil; a lower contact button projecting upwardly from the freely depressible end of said lower contact spring's upper arm, an upper contact spring bent back on itself to form upper and lower arms similar to said lower contact spring, disposed at right angles to said lower contact spring and parallel to said wall below said projecting ends of said core; the lower arm of said upper contact spring being rigidly fastened to said base plate and having current carrying connection with a third terminal connector mounted on the underside of said base plate; an upper contact button depending from the free end of said upper contact spring's upper arm in registering relation above said lower contact button, an armature button disposed in registering relation above said upper contact button and on the opposite side of said upper spring therefrom to thereby insulate said upper contact spring from one of said projecting ends of said core, a pair of depending insulating ears extending downwardly from said armature and insulating said armature from said upper contact spring, and an upper leaf spring inserted in one upper corner of said armature, bent backwardly along the length of said armature and extending angularly upward therefrom to meet a depending adjustment screw adapted to be threaded vertically to thereby regulate the resistance said leaf spring exerts against the rotative movement of said armature as induced by the magnetic attraction of said armature to said electromagnet when current is flowing through said coil.

6. In an electrical circuit control device for opening and closing the starting circuit of an electric motor or the like in response to the current flow in the working windings of said motor, a unitary open bottomed outer housing, an insulating base plate adapted to be received in and close over the open bottom of said housing, a vertical inner wall extending between said base plate and the top wall of said outer housing, rigid permanent connective means between said wall and said base plate whereby said inner wall and base plate are removable as a unit from said housing; removable connective means between the upper reaches of said inner wall and said top wall of said housing for detachably joining said inner wall and base plate to said housing, an electromagnet mounted on one side of said inner wall, having laminated core ends projecting at right angles to said inner wall and extending therethrough at opposite ends of said wall, said electromagnet being adapted for electrical energization; an armature pivotally mounted on a central horizontal axis between said two projecting core ends on the opposite side of said inner wall from said electromagnet, said armature being characterized by a pair of metal plates separated by a third plate of insulating material all rigidly joined together as a single unit; a pair of downwardly depending ears associated with said insulating armature plate disposed on opposite sides of said pivotal axis thereof, a double leaf upper contact spring mounted directly below said armature, parallel to said inner wall, said spring having circuit connection with a terminal on said base plate; a double leaf lower contact spring mounted on said base plate, transversely of said inner wall and upper contact spring at one end thereof and having circuit connection with said electromagnet and an additional terminal on said base plate; a pair of contact buttons disposed over and under one another, one each on upper leaves of each of said contact springs, adapted to meet in closed circuit contact in response to depressing actuation of said armature by said electromagnet; an insulating armature button disposed above said contact buttons and between said upper contact spring and an adjacent overhanging projecting core end of said electromagnet, said insulating armature button being resiliently movable with said upper contact spring; an adjusting screw engageable externally of said housing and adapted for threaded vertical movement through said upper wall of said outer housing, and resilient spring means disposed between a lower depending end of said screw and said armature and having one end thereof connected to one end of said armature whereby said armature's resistance to responsive rotation, as induced by said electromagnet, may be adjusted by vertical positioning of said screw to thereby regulate the opening and closing characteristics and intervening air gap of said two contact buttons.

7. In a motor control switch of the class described, a magnetically attractable armature rotatably movable in response to energization of an electromagnet associated with said switch, said armature being characterized by a laminated construction comprising a pair of substantially rectangular metal plates, a third plate of insulating material inserted between and separating said first two plates with all three plates being rigidly tied together as a unit; depending ear means formed on said third plate adapted to close juxtaposed contacts of said switch in response to magnetically imposed rotational movement of said armature, and resilient leaf spring means having one end thereof insertably mounted in a slotted opening formed through said three plates at one end of said armature, said spring extending backwardly over said armature from said connecting slot junction therewith for biasing said armature away from said electromagnet's attractive field.

GRANT D. FITCH.

REFERENCES CITED

The following references are of record in the file of this patent:

UNITED STATES PATENTS

| Number | Name | Date |
|---|---|---|
| 300,253 | Hazazer | June 10, 1884 |
| 1,104,077 | Smith | July 21, 1914 |
| 2,104,399 | Kuhn | Jan. 4, 1938 |
| 2,320,252 | Vaughn | May 25, 1943 |
| 2,358,482 | Thompson | Sept. 19, 1944 |
| 2,425,668 | Bolesky | Aug. 12, 1947 |
| 2,438,609 | Juhasz | Mar. 30, 1948 |
| 2,506,792 | Juhasz | May 9, 1950 |